United States Patent
Lin et al.

(10) Patent No.: US 10,097,850 B2
(45) Date of Patent: Oct. 9, 2018

(54) METHOD AND APPARATUS FOR REMOVING REDUNDANCY IN MOTION VECTOR PREDICTORS

(71) Applicant: HFI Innovation Inc., Zhubei, Hsinchu County (TW)

(72) Inventors: Jian-Liang Lin, Su'ao Township, Yilan County (TW); Yi-Wen Chen, Taichung (TW); Yu-Wen Huang, Taipei (TW); Shaw-Min Lei, Zhubei (TW)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 15/061,213

(22) Filed: Mar. 4, 2016

(65) Prior Publication Data

US 2016/0191939 A1    Jun. 30, 2016

Related U.S. Application Data

(62) Division of application No. 14/123,200, filed as application No. PCT/CN2012/076762 on Jun. 12, 2012.

(Continued)

(51) Int. Cl.
*H04N 19/513* (2014.01)
*H04N 19/625* (2014.01)
(Continued)

(52) U.S. Cl.
CPC ......... *H04N 19/513* (2014.11); *H04N 19/119* (2014.11); *H04N 19/52* (2014.11); *H04N 19/625* (2014.11); *H04N 19/70* (2014.11)

(58) Field of Classification Search
CPC .................................................. H04N 19/577
(Continued)

(56) References Cited

U.S. PATENT DOCUMENTS

| 7,812,854 B1 | 10/2010 | Delker et al. |
| 2008/0069237 A1 | 3/2008 | Kondo et al. |

(Continued)

FOREIGN PATENT DOCUMENTS

| CN | 1523896 | 8/2004 |
| CN | 1688164 | 10/2005 |

(Continued)

OTHER PUBLICATIONS

Liu, S., et al.; "Method and syntax for partial CU merge;" Joint Collaborative Team on Video Coding (JCT-VC) of ITU-T 3G16 WP3 and ISO/IEC JTC1/SC29/WG11; Mar. 2011; pp. 1-5.

(Continued)

*Primary Examiner* — Jeremaiah C Hallenbeck-Huber
*Assistant Examiner* — Mainul Hasan
(74) *Attorney, Agent, or Firm* — Wolf, Greenfield & Sacks, P.C.

(57) ABSTRACT

A method implemented in an apparatus for video coding a current block coded in an Inter, Merge, or Skip mode determines neighboring blocks of the current block, wherein a motion vector predictor (MVP) candidate set is derived from MVP candidates associated with the neighboring blocks. The method determines at least one redundant MVP candidate, if said MVP candidate is within a same PU (Prediction Unit) as another MVP candidate in the MVP candidate set. The method removes said at least one redundant MVP candidate from the MVP candidate set, and provides a modified MVP candidate set for determining a final MVP, wherein the modified MVP candidate set corresponds to the MVP candidate set with said at least one redundant MVP candidate removed. Finally, the method encodes or decodes the current block according to the final MVP.

14 Claims, 8 Drawing Sheets

Related U.S. Application Data

(60) Provisional application No. 61/562,560, filed on Nov. 22, 2011, provisional application No. 61/500,903, filed on Jun. 24, 2011.

(51) Int. Cl.
*H04N 19/70* (2014.01)
*H04N 19/119* (2014.01)
*H04N 19/52* (2014.01)

(58) Field of Classification Search
USPC .................................................. 375/240.16
See application file for complete search history.

(56) References Cited

U.S. PATENT DOCUMENTS

| | | | |
|---|---|---|---|
| 2011/0176612 A1 | 7/2011 | Tsai | |
| 2011/0176613 A1* | 7/2011 | Tsai | H04N 19/56 375/240.16 |
| 2011/0194609 A1 | 8/2011 | Rusert et al. | |
| 2012/0307903 A1 | 12/2012 | Sugio | |
| 2013/0077691 A1* | 3/2013 | Zheng | H04N 19/105 375/240.16 |

FOREIGN PATENT DOCUMENTS

| | | |
|---|---|---|
| CN | 1798339 | 7/2006 |
| CN | 101860754 | 10/2010 |
| EP | 2 003 902 | 12/2008 |
| KR | 1020040008562 | 1/2004 |

OTHER PUBLICATIONS

Lin, J.L., et al.; "AhG Parsing Robustness: Constrained Usage of Temporal MV and MVP Candidates;" Joint Collaborative Team on Video Coding (JCT-VC) of ITU-T SG16 WP3 and ISO/IEC JTC1/SC29/WG11; Mar. 2011; pp. 1-7.

Zheng, Y., et al.; "Unified Motion Vector Predictor Selection for Merge and AMVP;" Joint Collaborative Team on Video Coding (JCT-VC) of ITU-T SG16 WP3 and ISO/IEC JTC1/SC29/WG11; Mar. 2011; pp. 1-6.

Fukushima, S., et al.; "Unified Motion Vector Removal Process for AMVP;" Joint Collaborative Team on Video Coding (JCT-VC) of ITU-T SG16 WP3 and ISO/IEC JTC1/SC29/WG11; Mar. 2011; pp. 1-9.

* cited by examiner

METHOD AND APPARATUS FOR REMOVING REDUNDANCY IN MOTION VECTOR PREDICTORS

CROSS REFERENCE TO RELATED APPLICATIONS

The present invention is a Divisional of pending U.S. patent application Ser. No. 14/123,200, filed on Nov. 30, 2013, which is a National Phase of PCT/CN2012/076762, filed on Jun. 12, 2012, which claimed priority to U.S. Provisional Patent Application, No. 61/500,903, filed Jun. 24, 2011, entitled "Method for removing redundancy in motion vector predictors" and U.S. Provisional Patent Application, No. 61/562,560, filed Nov. 22, 2011, entitled "Method for reordering or removing the MVP located within previous PUs for Merge mode". The U.S. Provisional Patent Applications are hereby incorporated by reference in their entirety.

FIELD OF THE INVENTION

The present invention relates to video coding. In particular, the present invention relates to coding techniques associated with derivation of motion vector predictors for motion vector coding.

BACKGROUND

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. In a conventional coding system, side information associated with spatial and temporal prediction may have to be transmitted, which will take up some bandwidth of the compressed video data. The transmission of motion vectors for temporal prediction may require a noticeable portion of the compressed video data, particularly in low-bitrate applications. Accordingly, motion vector prediction has been widely used in the field to reduce bitrate corresponding to the motion vector coding.

High-Efficiency Video Coding (HEVC) is a new international video coding standard that is being developed by the Joint Collaborative Team on Video Coding (JCT-VC). HEVC is based on the hybrid block-based motion-compensated DCT-like transform coding architecture. The basic unit for compression, termed Coding Unit (CU), is a 2N×2N square block, and each CU can be recursively split into four smaller CUs until a predefined minimum size is reached. Each CU contains one or multiple Prediction Units (PUs). The PU sizes can be 2N×2N, 2N×N, 2N×nU, 2N×nD, N×2N, nL×2N, nR×2N, or N×N, where 2N×N, 2N×nU, 2N×nD and N×2N, nL×2N, nR×2N correspond to horizontal and vertical partition of a 2N×2N PU with symmetric or asymmetric PU size division respectively.

To further increase the coding efficiency of motion vector coding in HEVC, the motion vector competition (MVC) based scheme is applied to select one motion vector predictor (MVP) among a given MVP candidate set which includes spatial and temporal MVPs. There are three inter-prediction modes including Inter, Skip, and Merge in the HEVC test model version 3.0 (HM-3.0). The Inter mode performs motion-compensated prediction with transmitted Motion Vector Differences (MVDs) that can be used together with MVPs for deriving motion vectors (MVs). The Skip and Merge modes utilize motion inference methods (MV=MVP+MVD where MVD is zero) to obtain the motion information from spatial neighboring blocks (spatial candidates) or temporal blocks (temporal candidates) located in a co-located picture. The co-located picture is the first reference picture in list 0 or list 1, which is signaled in the slice header.

When a PU is coded in either Skip or Merge mode, no motion information is transmitted except for the index of the selected candidate. In the case of a Skip PU, the residual signal is also omitted. For the Inter mode in HM-3.0, the Advanced Motion Vector Prediction (AMVP) scheme is used to select a motion vector predictor among an AMVP candidate set including two spatial MVPs and one temporal MVP. As for the Merge and Skip mode in HM-3.0, the Merge scheme is used to select a motion vector predictor among a Merge candidate set containing four spatial MVPs and one temporal MVP.

For the Inter mode, the reference picture index is explicitly transmitted to the decoder. The MVP is then selected among the candidate set for a given reference picture index. FIG. 1 illustrates the MVP candidate set for the Inter mode according to HM-3.0, where the MVP candidate set includes two spatial MVPs and one temporal MVP:
1. Left predictor (the first available MV from $A_0$ and $A_1$),
2. Top predictor (the first available MV from $B_0$, $B_1$, and $B_{n+1}$), and
3. Temporal predictor (the first available MV from $T_{BR}$ and $T_{CTR}$).

A temporal predictor is derived from a block ($T_{BR}$ or $T_{CTR}$) in a co-located picture, where the co-located picture is the first reference picture in list 0 or list 1. The block associated with the temporal MVP may have two MVs: one MV from list 0 and one MV from list 1. The temporal MVP is derived from the MV from list 0 or list 1 according to the following rule:
1. The MV that crosses the current picture is chosen first, and
2. If both MVs cross the current picture or both do not cross, the MV with the same reference list as the current list will be chosen.

In HM-3.0, if a particular block is encoded in the Merge mode, an MVP index is signaled to indicate which MVP among the MVP candidate set is used for this block to be merged. To follow the essence of motion information sharing, each merged PU reuses the MV, prediction direction, and reference picture index of the selected candidate. It is noted that if the selected MVP is a temporal MVP, the reference picture index is always set to the first reference picture. FIG. 2 illustrates the MVP candidate set for the Merge mode according to HM-3.0, where the MVP candidate set includes four spatial MVPs and one temporal MVP:
1. Left predictor ($A_m$),
2. Top predictor ($B_n$),
3. Temporal predictor (the first available MV from $T_{BR}$ or $T_{CTR}$),
4. Above-right predictor ($B_0$), and
5. Below-left predictor ($A_0$).

In HM-3.0, a process is utilized in both Inter and Merge modes to avoid an empty candidate set. The process adds a candidate with a zero MV to the candidate set when no candidate can be inferred in the Inter or Merge mode.

Based on the Rate-Distortion Optimization (RDO) decision, the encoder selects one final MVP within a given MVP candidate set for the Inter, Skip, or Merge mode and transmits the index of the selected MVP to the decoder after removing the redundant candidates. In the AMVP scheme, temporal motion predictor is included in the candidate set of motion vector predictors (MVPs) to improve the coding efficiency. However, there is also a drawback of using temporal motion prediction since any parsing error associated with the temporal motion predictor may cause severe error propagation. When a motion vector of a previous picture cannot be decoded correctly, a mismatch between the candidate set on the encoder side and that on the decoder side may occur. This mismatch may result in parsing error of the index of the best MVP candidate and cause the rest of the current picture parsed or decoded erroneously. Furthermore, this parsing error can affect subsequent inter pictures that allow temporal MVP candidates.

In HEVC, a process is developed to compress the memory associated with MV information in a coded picture for temporal MVPs. The process of memory compression for MV information is termed Motion Data Storage Reduction (MDSR) in HEVC. In this method, MV data of one block in an MDSR unit will be used as the representative MV data for the entire MDSR unit, and all the MV data of other blocks in the MDSR will be discarded.

The AMVP scheme derives MVP candidates from neighboring blocks in the same picture as well as co-located blocks from reference pictures. With the availability of these MVP candidates, a better prediction, i.e., smaller MVD, for an underlying MV may be achieved. However, during the AMVP process, an MVP may be redundant under certain circumstances. It is desirable to remove the redundancy in motion vector prediction to reduce complexity and/or to improve performance.

BRIEF SUMMARY OF THE INVENTION

A method and apparatus of deriving a motion vector predictor (MVP) for a current block in an Inter, Merge, or Skip mode are disclosed. Embodiments according to the present invention determine redundant MVP candidates according to a non-MV-value based criterion. The redundant MVP candidates are then removed from the MVP candidate set. In one embodiment, MVP candidates within a same PU (Processing Unit) or same MDSR (Motion Data Storage Reduction) unit are determined to be redundant. MVP candidates, that located in different PUs and the different PUs are merged, are also determined to be redundant. In another embodiment, one MVP candidate is redundant if a first MVP candidate is coded as an Inter mode according to a second MVP candidate and zero MVD (Motion Vector Difference) and without scaling. In yet another embodiment, one or more of the MVP candidates are redundant if said one or more of the MVP candidates cause the second 2N×N, 2N×nU, 2N×nD, N×2N, nL×2N or nR×2N PU to be merged into a 2N×2N PU. Similarly, one or more of the MVP candidates are determined to be redundant if said one or more of the MVP candidates cause the fourth N×N PU to be merged into a 2N×N, N×2N, 2N×nU, 2N×nD, nL×2N, nR×2N or 2N×2N PU. In another embodiment, for the second 2N×N, 2N×nU, 2N×nD, N×2N, nL×2N or nR×2N PU, one or more of the MVP candidates are redundant and removed if said one or more of the MVP candidates located within the previous (first) 2N×N, 2N×nU, 2N×nD, N×2N, nL×2N or nR×2N PU.

In other embodiments according to the present invention, motion IDs are assigned to MVP candidates to follow the trail of motion vectors associated with the MVP candidate. An MVP candidate having a same motion ID as a previous MVP candidate is redundant and can be removed from the MVP candidate set. A unique motion ID is assigned to a new MV in an Inter mode. Also, a unique motion ID is assigned to a new MV associated with a block, wherein the block is merged with another block with a new temporal MVP. For MVP candidates associated with blocks that are merged with respective blocks associated with temporal MVPs from the same MDSR unit using the same scaling factor, the same motion ID is assigned to the MVs associated with blocks. A unique motion ID is assigned to a MV that is merged with an MVP candidate having a zero MV created by a process to avoid empty candidate set in Merge mode. In an Inter mode, if MVD is zero, a unique motion ID is also assigned to an MV that is predicted by an MVP candidate with zero MV created by a process to avoid empty candidate set. The motion ID for an MV associated with a first block in a Merge/Skip mode can be inherited from a second block that the first block is merged. The motion ID for an MV associated with a block coded in an Inter mode with zero MVD can also be inherited from a neighboring block, wherein the neighboring block has an associated MV that is the same as a derived MVP based on the MV and the MVD with scaling. For a second 2N×N, 2N×nU, 2N×nD, N×2N, nL×2N or nR×2N PU in a Merge mode, the MVP candidates with motion ID identical to the motion ID of the first PU can be removed to avoid imitating a 2N×2N PU Merge. Similarly, for the fourth N×N PU in a Merge mode, the MVP candidates having the same motion ID as one or more other N×N PUs to cause the fourth N×N PU to be merged into a 2N×N, N×2N, 2N×nU, 2N×nD, nL×2N, nR×2N or 2N×2N PU can be removed. A syntax element is incorporated in a sequence, picture or slice header to indicate whether motion IDs are used for the MVP candidates.

In yet another embodiment according to the present invention, the method comprising: determining neighboring blocks for a second 2N×N, 2N×nU, 2N×nD, N×2N, nL×2N or nR×2N PU (Processing Unit), wherein an MVP candidate set is generated from MVP candidates associated with the neighboring blocks; removing one or more redundant MVP candidates from the MVP candidate set, wherein said one or more redundant MVP candidates correspond to one or more of the MVP candidates that cause the second 2N×N, 2N×nU, 2N×nD, N×2N, nL×2N or nR×2N PU to be merged into a 2N×2N PU; and determining the MVP for the 2N×N, 2N×nU, 2N×nD, N×2N, nL×2N or nR×2N PU based on the MVP candidate set with said one or more redundant MVP candidates removed.

DETAILED DESCRIPTION OF THE INVENTION

As mentioned before, the AMVP scheme derives MVP candidates from neighboring blocks in the same picture as well as co-located blocks from reference pictures. The efficiency of AMVP depends on the availability of MVP candidates and the quality of the MVP candidates (i.e., accuracy of the MVP). On the other hand, an MVP candidate may be redundant under certain circumstances according to the AMVP process described in HM-3.0. The redundant MVP candidate may be removed to reduce complexity and/or to improve performance. Accordingly, embodiments of the present invention are disclosed herein that remove redundancy in MVP candidates, where the redundancy is identified without the need to compare the MV value of the MVP candidate with a previous MVP.

Figure 3:
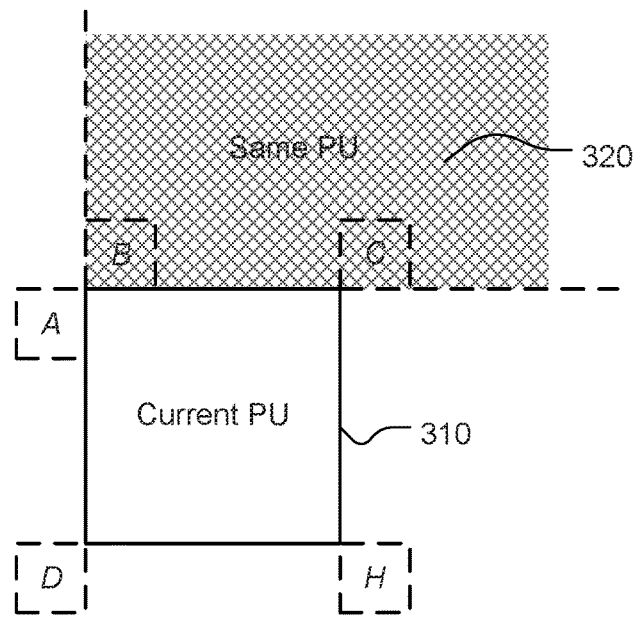
FIG. 3 illustrates an example of redundant MVP candidates due to MVP candidates in the same PU.

One embodiment of the present invention identifies and removes redundant MVP candidates in the same PU. If more than one MVP candidate in the MVP candidates set is located within in the same PU, the MVP candidates in the same PU will be identical. Therefore, the redundant MVP candidates can be removed without comparing their MVs. FIG. 3 illustrates an example of redundant MVP candidates in the Merge mode according to HM-3.0. As shown in FIG. 3, the MVP candidates are from spatial neighboring blocks including blocks A, B, C, and D around the current PU 310 and temporal block H from a co-located picture. The MVP candidates associated with blocks A, B, C, D, and H are represented as MVPs A, B, C, D, and H respectively. FIG. 3 illustrates a case that the PU 320 above the current PU 310 extends to the above-right area of the current PU 310. Since MVP B and MVP C are both located within the same PU, MVP C is redundant and can be removed without the need for comparing the MV at block C with a previous MVP. Alternatively, MVP B can be removed without the need for comparing the MV at block B with a previous MVP. In a conventional approach according to HM-3.0, the MV at block C has to be compared with a previous MVP to determine whether the MV and the previous MVP have a same value. If the values are the same, MVP C is considered to be redundant and is removed from the MVP candidate set. However, in a system embodying the present invention, the redundant MVP candidates are determined based on the fact that more than one MVP candidate is located in the same PU. There is no need of evaluating the MV (such as comparing the MV value) of the underlying MVP candidate. While the neighboring block configuration for the Merge mode according to HM-3.0 is used as an example, the embodiment of the present invention for determining and removing redundancy for MVP candidates in the same PU is applicable to other neighboring block configurations. For example, the spatial candidates may also be based on the neighboring block configuration shown in FIG. 1. Furthermore, while FIG. 3 illustrates an example that the same PU is located above the current PU, the same PU may also be located to the left of the current PU. The embodiment can also be applied to redundancy identification and removal for the Inter and Skip modes.

Figure 4:
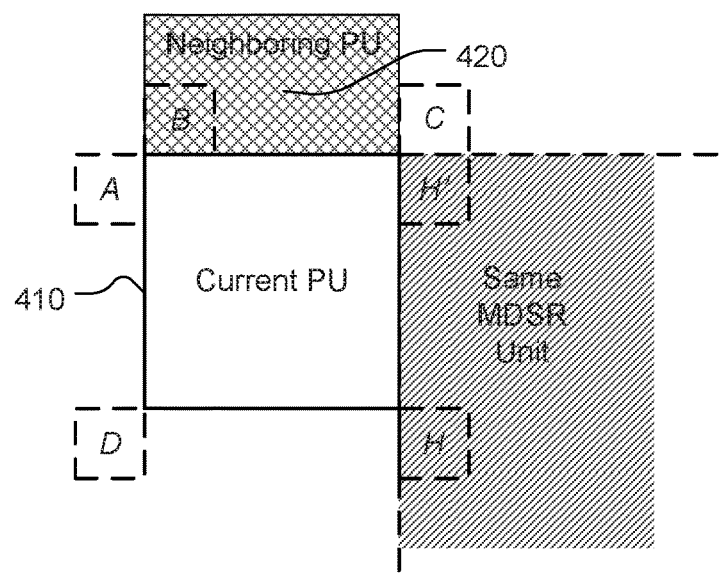
FIG. 4 illustrates an example of redundant MVP candidates caused by MDSR.

One embodiment of the present invention identifies and removes redundant MVP candidates caused by Motion Data Storage Reduction (MDSR). In HM-3.0, the temporal predictor is derived from a block located in a co-located picture and the MV is scaled according to the Picture Order Counts (POCs). When the process of MDSR is applied, it may cause one or more MVP candidates become redundant. FIG. 4 illustrates an example of redundancy in MVP candidates due to MDSR, where MVP H' and MVP H are within the same MDSR unit, have the same scaling factor, and are derived from the MV of the same reference picture list. If the neighboring PU 420 is merged with temporal MVP H' or selects temporal MVP H' with zero MVD, MVP B will be the same as MVP H'. On the other hand, MVP H' and MVP H are the same since they are in the same MDSR unit. Accordingly, MVP B is the same as MVP H. Since both MVP B and MVP H belong to the MVP candidate set of the current PU 410, one of MVP B and MVP H is redundant and can be removed from the MVP candidate set. The neighboring block configuration, the neighboring PU and the MDSR shown in FIG. 4 are used to illustrate an example embodying the present invention. The present invention may be practiced for other neighboring block configurations, other neighboring PU arrangements, and other MDSR units. For example, the neighboring PU may be located to the left of the current PU. The MDSR may correspond to blocks around other boundaries around the current PU.

Figure 5:
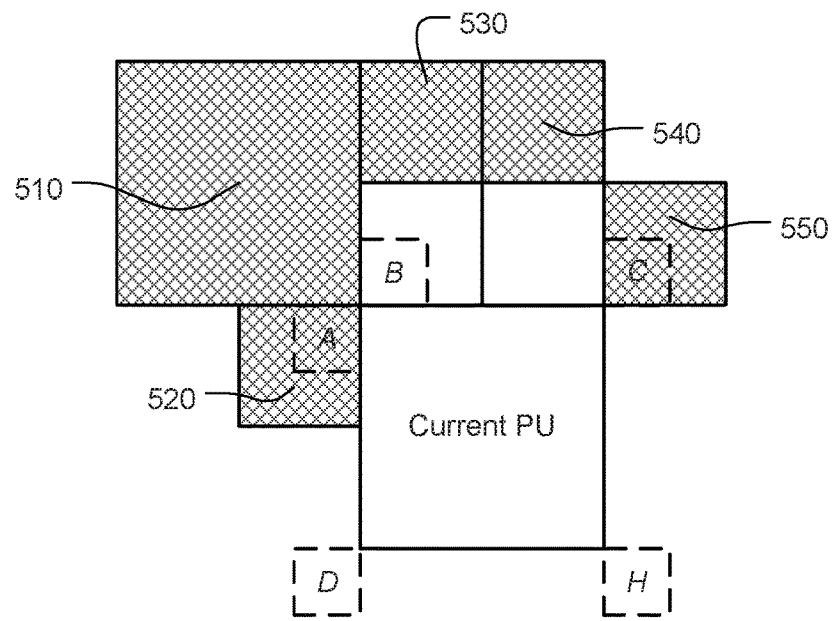
FIG. 5 illustrates an example of redundant MVP candidates caused by merging of blocks associated with MVP candidates.

One embodiment of the present invention identifies and removes redundant MVP candidates caused by block merging. If multiple MVP candidates are located in different PUs and the PUs are merged together, those MVP candidates will be identical. The redundant MVP candidates can be removed accordingly. FIG. 5 illustrates an example where the blocks 510 through 550, shown as shaded blocks, indicate the PUs that are merged together. Since MVP A and MVP C are identical due to the merge operation, one of the two MVP candidates is redundant and can be removed. Again, the neighboring block configuration and the merged PUs are used to illustrate an example embodying the present invention. A skilled person in the art may use other neighboring block configurations and other merged PUs to practice the present invention.

Figure 6:
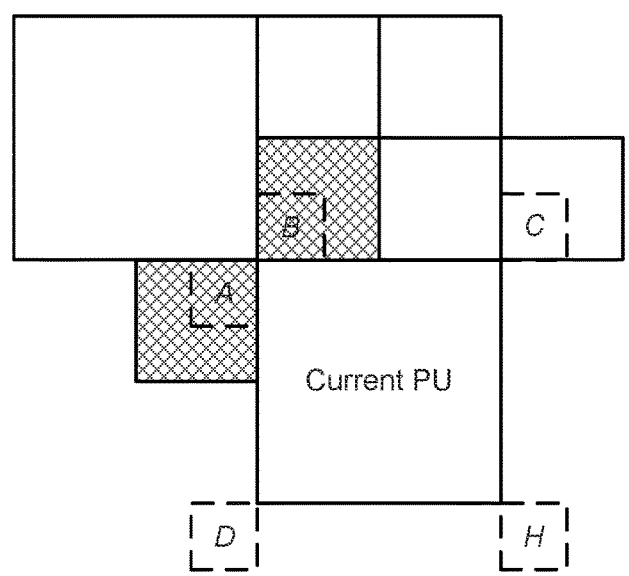
FIG. 6 illustrates an example of redundant MVP candidates caused by the Inter mode, where one block is coded in the Inter mode using the MV of the other block without scaling and with zero MVD.

One embodiment of the present invention identifies and removes redundant MVP candidates caused by Inter mode associated with zero MVD. If multiple MVP candidates are located in different PUs and one MVP candidate is predicted according to the Inter mode by another MVP candidate with zero MVD, the MVP candidates will be identical and the redundancy can be removed. FIG. 6 illustrates an example of a redundant MVP candidate due to Inter mode associated with zero MVD. The PU of MVP A is coded as Inter mode using MVP B without scaling and with zero MVD. For the current PU, MVP A and MVP B are identical. Therefore, one of MVP A and MBP A is redundant and can be removed. A skilled person in the art may use other neighboring block configurations to practice the present invention.

Figure 1:
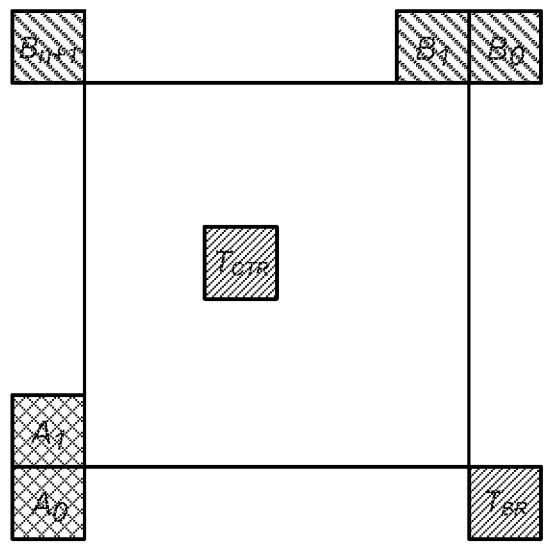
FIG. 1 illustrates neighboring block configuration for deriving spatial/temporal MVP candidates for Inter and Skip modes according to HM-3.0.
Figure 2:
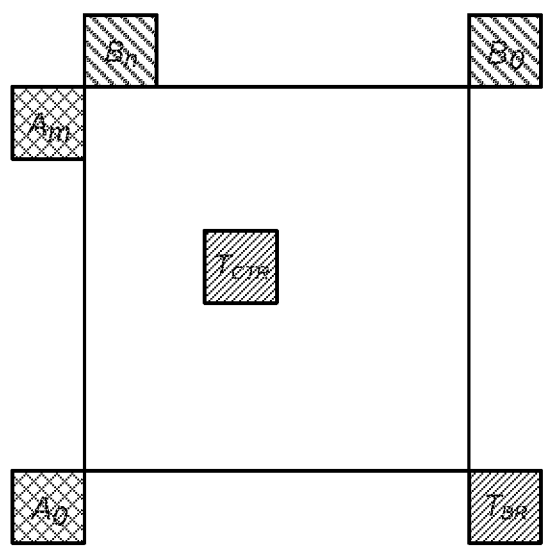
FIG. 2 illustrates neighboring block configuration for deriving spatial/temporal MVP candidates for the Merge mode according to HM-3.0.
Figure 7A:
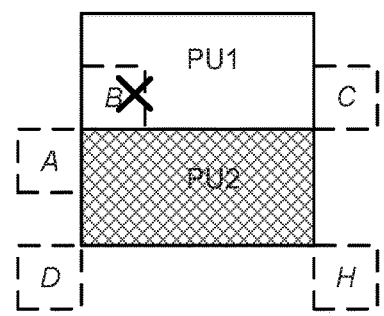
FIG. 7A-FIG. 7H illustrate examples of redundant MVP candidates in 2N×N, N×2N, 2N×nU, 2N×nD, nL×2N or nR×2N Merge mode.
Figure 7B:
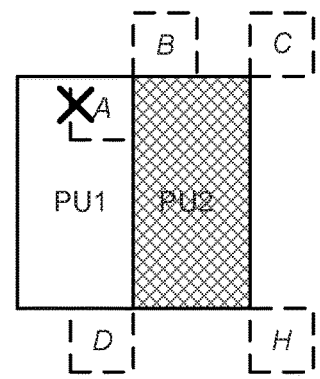
Figure 7C:
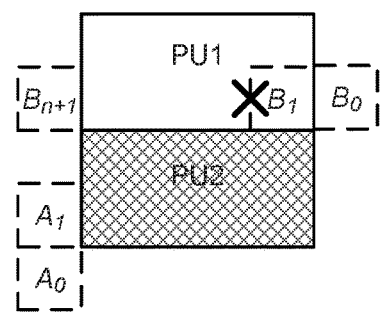
Figure 7D:
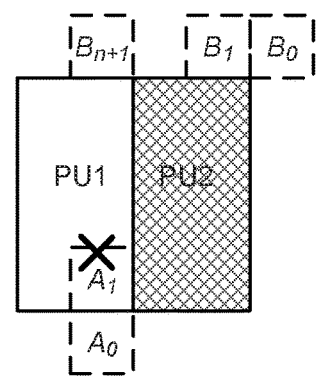
Figure 7E:
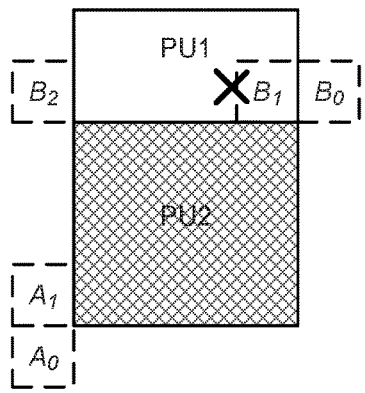
Figure 7F:
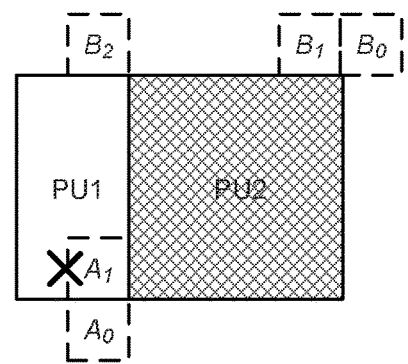
Figure 7G:
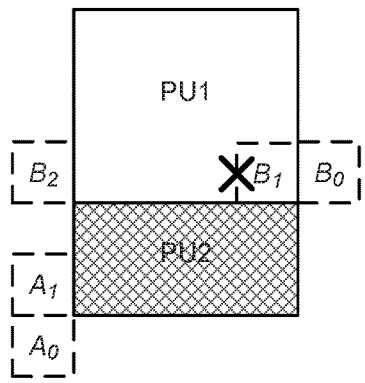
Figure 7H:
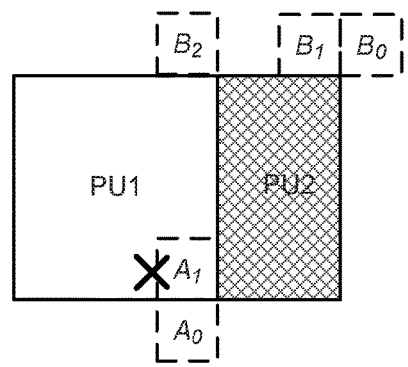

One embodiment of the present invention identifies and removes redundant MVP candidates to avoid imitation of Merge. In HEVC, a 2N×2N PU may be partitioned into 2N×N, 2N×nU, 2N×nD, N×2N, nL×2N or nR×2N PUs according to the Rate-Distortion Optimization (RDO) process, where 2N×nU, 2N×nD, nL×2N and nR×2N are asymmetrical motion partition (AMP) PUs. If the second 2N×N 2N×nU, 2N×nD, N×2N, nL×2N or nR×2N PU is merged with the first PU, the two 2N×N 2N×nU, 2N×nD, N×2N, nL×2N or nR×2N PUs will be merged back into one 2N×2N PU. Therefore, the second PU should avoid the respective 2N×N 2N×nU, 2N×nD, N×2N, nL×2N or nR×2N Merge mode so that two 2N×N 2N×nU, 2N×nD, N×2N, nL×2N or nR×2N PUs will not be merged back into a 2N×2N PU. The scenario that multiple partitioned PUs from an original PU are merged back to form the original PU is termed imitation of Merger. Consequently, the MVP candidates of a current PU that may cause the current PU to be merged with other PUs to cause imitation of Merge is considered redundant and can be removed without comparing the MV values. For example, for the second PU of 2N×N, 2N×nU, 2N×nD, N×2N, nL×2N or nR×2N Merge mode, those MVPs which are located within the previous (first) PUs and will naturally make this 2N×N, 2N×nU, 2N×nD, N×2N, nL×2N or nR×2N PU merge as a 2N×2N PU can be removed without comparing the values of MVs. FIG. 7A and FIG. 7B illustrate examples of redundancy due to imitation of 2N×N and N×2N Merge respectively. As shown in FIG. 7A, MVP B for the second 2N×N PU in the 2N×N Merge mode can be removed to avoid the duplication. In FIG. 7A, MVP A for the second N×2N PU in the N×2N Merge mode can be removed to avoid the imitation of Merge. The neighboring block configuration shown in FIGS. 7A and 7B for determining spatial/temporal MVPs are used for illustration purpose. A system may adopt other neighboring block configurations, and the MVP redundancy due to the imitation of Merge can be identified and removed according to the present invention. For example, the neighboring block configuration for the Inter and Skip modes as shown in FIG. 1 may be used for the Merge mode as well. The redundancy due to imitation of Merge can be determined as shown in FIG. 7C-FIG. 7H. In FIG. 7C, MVP $B_1$ for 2N×N PU2 is from 2N×N PU1. The 2N×N PU1 and PU2 merging will cause the imitation of Merge. Accordingly, MVP $B_1$ is determined to be redundant and is removed from the MVP candidate set. Similarly, MVP $A_1$ in FIG. 7D, MVP $B_1$ in FIG. 7E, MVP $A_1$ in FIG. 7F, MVP $B_1$ in FIG. 7G and MVP $A_1$ in FIG. 7H are determined to be redundant and are removed from the MVP candidate set, respectively.

Figure 8A:
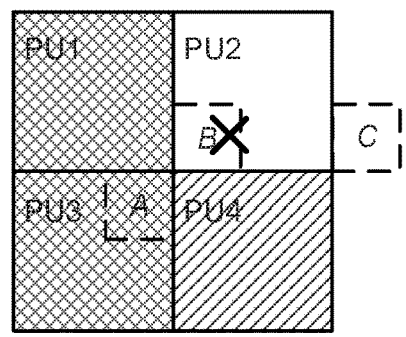
FIG. 8A-FIG. 8C illustrate examples of redundant MVP candidates in N×N Merge mode.
Figure 8B:
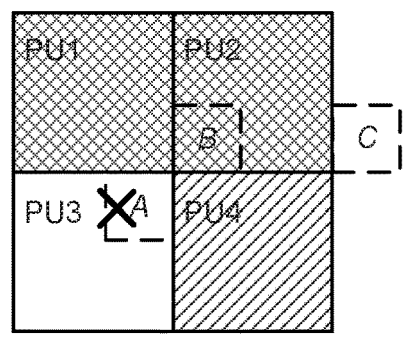
Figure 8C:
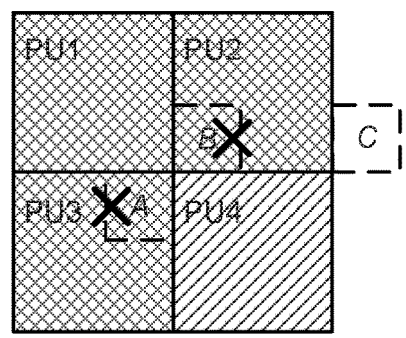

For the fourth PU in N×N Merge mode, those MVPs that will cause the N×N PUs merged as one of 2N×2N, 2N×N, 2N×nU, 2N×nD, nL×2N, nR×2N or N×2N PU can also be removed without comparing the MV values. FIGS. 8A-C illustrate examples of redundant MVP candidate removal to avoid the imitation of N×N Merge mode. As shown in FIG. 8A, if PU1 and PU3 are merged, MVP B of PU4 is removed from MVP candidate set to avoid the imitation of N×2N PU Merge according to the present invention. In FIG. 8B, if PU1 and PU2 are merged, MVP A of PU4 is removed from MVP candidate set to avoid the imitation of 2N×N PU Merge according to the present invention. In FIG. 8C, if PU1, PU2 and PU3 are merged, MVP A and MVP B are removed from MVP candidate set to avoid the imitation of 2N×2N Merge according to the present invention.

Figure 9:
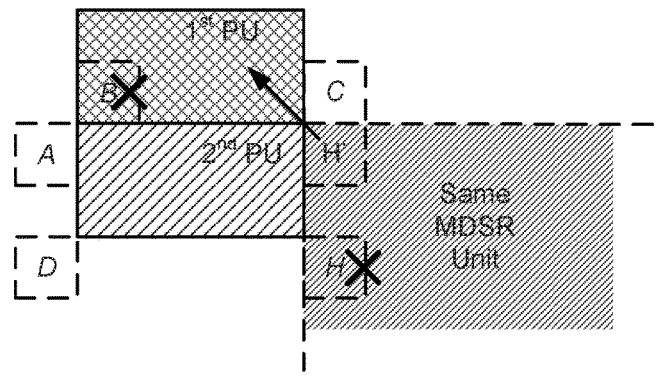
FIG. 9 illustrates an example of redundant MVP candidates caused by combination of different types of redundancy.

One embodiment of the present invention identifies and removes redundant MVP or MVPs caused by combination of different types of processes that may cause redundancy. The redundancy may be caused by the interaction between two processes. An example is shown in FIG. 9, where MVP H' and MVP H are within the same MDSR unit and have same scaling factor. Therefore, either MVP H or MVP H's can be removed. MVP H is removed in the example of FIG. 10. Furthermore, it is assumed that the first 2N×N PU is merged with MVP H'. In order to avoid the imitation of 2N×2N PU Merge, MVP B for the second PU is removed. While the combination of 2N×N PU Merge and MDSR is used as an example of MVP redundancy, the current invention can be practiced for other combinations of two or more processes, where combination of the processes may cause MVP redundancy. Accordingly, any of the cases that cause redundancy in MVP candidates as mentioned above can be combined with another case.

One embodiment of the present invention identifies and removes redundant MVP candidates using motion ID. This embodiment utilizes motion ID to track the inheritance process of motion information passed from a coded PU to the current PU so as to follow the trail of the MV. The motion ID is used to help identify redundancy in MVP candidates without the need for comparing the MV values. In addition, motion ID also offers a benefit of alleviating parsing error and error propagation. In order to reduce the bits used to encode the index of motion vector predictor (MVP), redundant MVPs are removed from the MVP candidate set. However, this can cause parsing errors leading to severe error propagation. When a motion vector (MV) of a previous picture cannot be decoded correctly, a mismatch between the candidate set on the encoder side and that on the decoder side may occur, resulting in parsing error of the index of the best MVP. Consequently, the rest of the current picture cannot be parsed or decoded properly. What is even worse, this parsing error can affect subsequent inter pictures that also use temporal MVPs. Motion identification (ID) is proposed to describe the inheritance process of motion information passed from a coded PU to the current PU to follow the trail of the MV. A unique motion ID is assigned for each new MV created in the Inter mode and can be inherited through the Merge and Skip modes. By comparing the motion ID, the MVP having the same motion ID as a previous MVP in the candidate set can thus be removed. Even if the MV of a previous picture had not been correctly decoded, the decision of redundancy will not be affected because the inherent of motion ID does not rely on the motion vector values.

Figure 10:
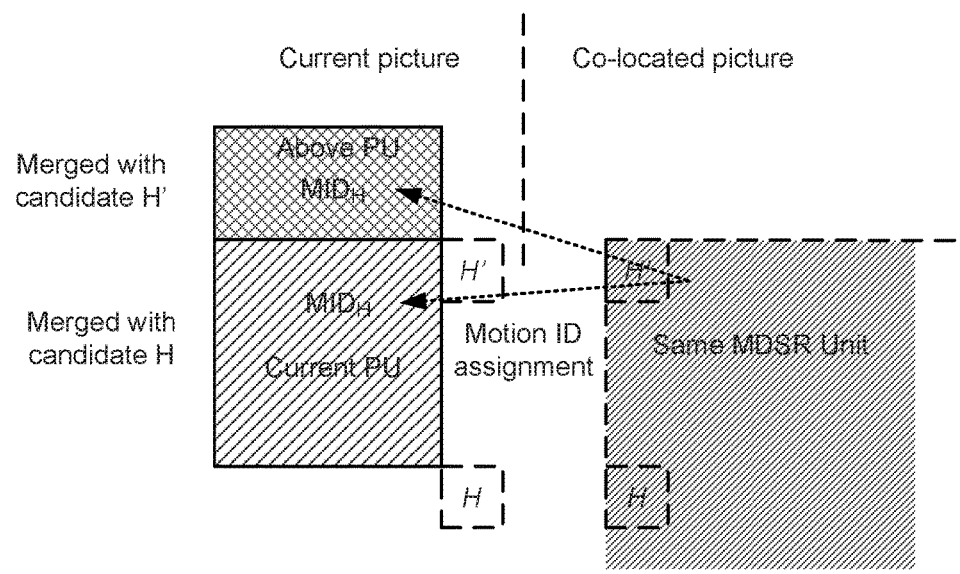
FIG. 10 illustrates an example of motion ID assignment for MVP candidates corresponding to blocks that are merged with respective blocks having motion information derived from a same MDSR unit.

A unique motion ID is assigned to each new MV associated with a block in the Inter mode (new MV=MVP+MVD) or Merge mode. For Merge mode, a new MV occurs when a block is merged with a temporal block having a new temporal MVP. If two PUs are merged with respective co-located blocks, where the temporal MVPs associated with the co-located blocks are within the same MDSR unit, and based on the same target reference picture and same picture reference list, the same motion ID will be assigned to the MVs associated with the two PUs. FIG. 10 illustrates an example of motion ID assignment in the case that MVP redundancy exists. The above PU and the current PUs are merged with temporal block H' and block H respectively. Both MVP H and MVP H' are derived from the co-located blocks within the same MDSR unit. Therefore, a same motion ID (i.e., $MID_H$) is assigned to the above PU and the current PU. In another case, a unique motion ID is assigned to the MVs that are merged with or predicted (with zero MVD) by the MVP candidates with zero MVs, where the zero MVs are created by the process of avoiding empty MVP candidate set in HEVC.

Figure 11A:
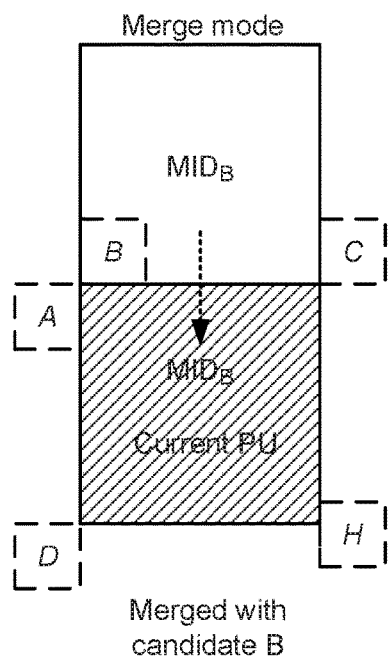
FIG. 11A-FIG. 11B illustrate examples of motion ID inheritance through motion information sharing.
Figure 11B:
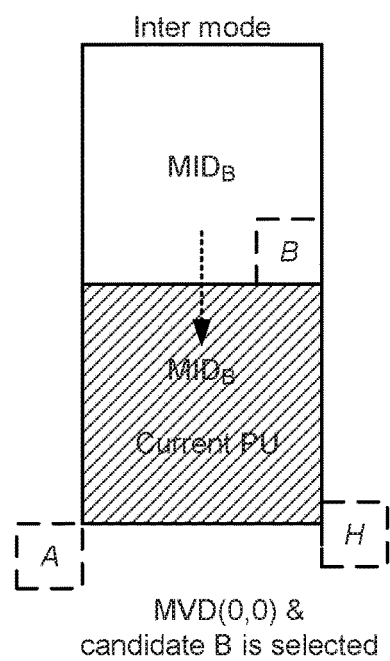

The motion ID can be inherited in the Merge, Skip and Inter modes. In the Merge mode, an MVP index is signaled to indicate which MVP candidate of the MVP candidate set is used for the current block to be merged. To follow the essence of motion information sharing, each merged PU reuses the MV, prediction direction, and reference picture index of the selected candidate. FIG. 11A illustrates an example of motion ID inheritance for the Merge mode. The current PU is merged with MVP candidate B and inherits the motion ID (i.e., $MID_B$) of the selected MVP candidate. FIG. 11B illustrates an example motion ID inheritance for the Inter mode. The motion ID (i.e., $MID_B$) is inherited according to the Inter mode when the MVD equals to zero and the derived MVP is exactly the same as that of the neighboring block (without scaling). In a system using the motion ID, the MVP which has an identical motion ID with a previous MVP can be removed without the need to compare the MV value.

One embodiment of the present invention identifies and removes redundant MVP or MVPs to avoid imitation of Merge using motion ID. For the second PU in 2N×N or N×2N Merge mode, those MVPs with motion ID identical to that of the first PU can be removed without comparing the MV values. The examples of MVP redundancy for the second PU in 2N×N or N×2N Merge mode as shown in FIGS. 7A-D can be used to illustrate redundancy identification and removal to avoid imitation of Merge using the motion ID. For the fourth PU in the N×N Merge mode, those MVP candidates that will cause the N×N PU to be merged as one of 2N×2N, 2N×N or N×2N PU can also be removed according to the motion ID. Technique to remove redundancy to avoid the imitation caused by N×N Merge mode is described previously and FIGS. 8A-C are used to illustrate cases corresponding to various N×N Merge modes. In the current embodiment, an alternative is used to remove the redundancy, where the redundancy is determined according to the motion ID. Again, FIGS. 8A-C are used to illustrate the cases corresponding to various N×N Merge modes, where the current PU is PU4. In FIG. 8A, if PU1 and PU3 have the same motion ID, the MVP candidates whose motion IDs are identical to that of PU2 can be removed to avoid the imitation of N×2N Merge. In FIG. 8B, if PU1 and PU2 have the same motion ID, the MVPs whose motion IDs are identical to that of PU3 can be removed to avoid the imitation of 2N×N Merge. In FIG. 8C, if PU1, PU2 and PU3 have the same motion ID, the MVPs whose motion IDs are identical to that of PU1, PU2 and PU3 can be removed to avoid the imitation of 2N×2N Merge.

The above description is presented to enable a person of ordinary skill in the art to practice the present invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The method of MVP redundancy is identified using a non-MV-value based criterion according to the present invention. Various non-MV-value based criteria have been disclosed. Accordingly, the redundant MVP candidates can be identified and removed from the MVP candidate set. A system embodying the present invention uses a modified MVP candidate set with redundant MVP candidate removed. In one embodiment, motion IDs are assigned to MVP candidates and are used to identify redundancy in MVP candidates. The system may use a syntax element that is incorporated in a sequence, picture or slice header to indicate whether said one or more redundant MVP candidates are removed from the MVP candidate set. In the case that the motion ID is used, the system may use a syntax element that is incorporated in a sequence, picture or slice header to indicate whether motion IDs are used for the MVP candidates.

Embodiment of MVP redundancy removal according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different formats or styles. The software code may also be compiled for different target platforms. However, different code formats, styles and languages of software code and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A video coding method for a current block coded in an Inter, Merge, or Skip mode, the method comprising:
   determining neighboring blocks of the current block of a current picture, wherein the current picture is divided into a plurality of prediction units (PU s), wherein the current block is a PU of the current picture;
   determining a motion vector predictor (MVP) candidate set from MVP candidates associated with the neighboring blocks;
   identifying a redundant MVP candidate among the MVP candidate set based on at least one of:
      determining a first MVP candidate and a second MVP candidate in the MVP candidate set are 1) within a same PU (Prediction Unit) that is adjacent to the current block and 2) in the current picture and, in response, determining that the first MVP is the redundant MVP candidate; and
      determining a third MVP candidate in the MVP candidate set is associated with a neighboring block which is in a same coding unit (CU) as the current block, previously partitioned from the current block, and has a PU size different from the current block, and, in response, determining that the third MVP is the redundant MVP candidate;

providing a modified MVP candidate set for determining a final MVP, wherein the modified MVP candidate set corresponds to the MVP candidate set except the determined redundant MVP candidate; and encoding or decoding the current block according to the final MVP.

2. The method of claim 1, wherein the current block is a current PU (Prediction Unit).

3. The method of claim 1, wherein the MVP candidate set further comprises an MVP candidate associated with a temporal block from a co-located picture.

4. The method of claim 1, wherein the same PU is located above the current block.

5. The method of claim 1, wherein the same PU is located to the left of the current block.

6. The method of claim 1, wherein the final MVP is determined from the modified MVP candidate set based on a Rate-Distortion Optimization (RDO) decision.

7. The method of claim 6, further comprising transmitting an index of the final MVP to a decoder after removing said at least one redundant MVP candidate.

8. A video coding apparatus for coding a current block in an Inter, Merge, or Skip mode, the apparatus comprising one or more electronic circuits configured to:

determine neighboring blocks of the current block of a current picture, wherein the current picture is divided into a plurality of prediction units (PUs), wherein the current block is a PU of the current picture;

determine a motion vector predictor (MVP) candidate set from MVP candidates associated with the neighboring blocks;

identify a redundant MVP candidate among the MVP candidate set based on at least one of:

determine a first MVP candidate and a second MVP candidate in the MVP candidate set are 1) within a same PU (Prediction Unit) that is adjacent to the current block and 2) in the current picture and, in response, determine that the first MVP is the redundant MVP candidate; and determine a third MVP candidate in the MVP candidate set is associated with a neighboring block which is in a same coding unit (CU) as the current block, previously partitioned from the current block, and has a PU size different from the current block, and, in response, determine that the third MVP is the redundant MVP candidate;

provide a modified MVP candidate set for determining a final MVP, wherein the modified MVP candidate set corresponds to the MVP candidate set except the determined redundant MVP candidate; and encode or decode the current block according to the final MVP.

9. The apparatus of claim 8, wherein the current block is a current PU (Prediction Unit).

10. The apparatus of claim 8, wherein the MVP candidate set further comprises an MVP candidate associated with a temporal block from a co-located picture.

11. The apparatus of claim 8, wherein the same PU is located above the current block.

12. The apparatus of claim 8, wherein the same PU is located to the left of the current block.

13. The apparatus of claim 8, wherein the final MVP is determined from the modified MVP candidate set based on a Rate-Distortion Optimization (RDO) decision.

14. The apparatus of claim 13, further comprising transmitting an index of the final MVP to a decoder after removing said at least one redundant MVP candidate.

\* \* \* \* \*